Patented Nov. 24, 1925.

1,562,489

UNITED STATES PATENT OFFICE.

FREDERICK D. BASS, OF COLORADO SPRINGS, COLORADO, ASSIGNOR OF ONE-HALF TO B. W. SELDOMRIDGE, OF COLORADO SPRINGS, COLORADO.

COMPOSITION OF MATTER FOR PREVENTING CORROSION AND SULPHATION OF STORAGE BATTERIES.

No Drawing.   Application filed November 10, 1924.   Serial No. 749,036.

*To all whom it may concern:*

Be it known that I, FREDERICK D. BASS, a citizen of the United States, residing at Colorado Springs, in the county of El Paso and State of Colorado, have invented a new and useful Composition of Matter for Preventing Corrosion and Sulphation of Storage Batteries, of which the following is a specification.

This invention relates to a composition of matter for use on storage batteries to prevent corrosion of the terminals and sulphation of the plates. Batteries are composed of two sets of plates, positive and negative, immersed in an electrolyte, the principal ingredient of which is sulphuric acid. The positive plate is usually made of peroxide of lead while the negative plate is usually made of sponge lead and when formed of sheets of these materials, said sheets are usually separated by layers of wood, or other material. When the electrolyte comes in contact with the plate, a chemical action takes places resulting in the generation of heat and electricity, the normal temperature of the battery being about 80°. This temperature is increased materially when the generator connected with the battery is in operation and is also affected by the atmospheric temperature. This action produces sulphuric acid gas which escapes from the battery through the terminals and is known as "sweat." It acts on the metal cables connected with the terminals and as these are of copper serves to disintegrate them, forming a deposit of sulphate of copper which adheres to the terminals, cables and metal parts. This increases the resistance and load on the batteries and when a starter or other appliance is used, the temperature, if further increased, causes sulphation of the plates and burning and other deterioration of the plates, terminals, cables, etc. The battery also acts sluggishly, will burn out lights, and requires frequent recharging.

It is an object of the invention to provide a composition of matter which can be applied as a coating to the terminals and exposed metal parts of the batteries so that the deposit of sulphate of copper is interfered with as is also the escape of the "sweat" from the battery. Furthermore the life of the battery is considerably prolonged and the battery is rendered more efficient in every way. The composition used for the treatment of the battery as above outlined consists preferably of the following ingredients, substantially in the proportions stated, to wit:—

Ammonium carbonate _____ 1 lb.
Bicarbonate of soda _____ 5 lbs.
Hard oil grease (commercial) _____ 3 lbs.
Creosote _____ 1 oz.
Acid-proof paint (commercial) _____ 2 qts.
Crude oil _____ ½ pt.

The ammonium carbonate and the bicarbonate of soda are thoroughly mixed and to this mixture are added the acid-proof paint, the creosote and the crude oil. These ingredients are then stirred thoroughly until a paste is formed whereupon the hard oil is heated, melted and added to the foregoing mixture. The mixture is stirred for at least fifteen minutes and then placed in containers.

Although the ingredients mentioned are the ones preferred, it is to be understood that other ingredients having like characteristics can be substituted. The bicarbonate of soda and the ammonium carbonate, which are alkalies act to neutralize the acid in the form of sweat and serves to disintegrate the deposits on the terminals, cables, etc. The hard oil grease serves to obstruct the escape of "sweat" at the terminals while the crude oil assists in the formation of a paste and prevents the mixture from drying out too quickly. The acid-proof paint and the creosote are used to prolong the life of the paste by forming a thin coating on the exterior and preventing the admission of dirt and foreign matter. They also give color to the mixture and assist in the disintegration of the deposits.

What is claimed is:—

1. A composition of matter for use in the treatment of batteries which includes an alkali, a grease, and a means for maintaining the same in a paste form.

2. A composition of matter for use in the treatment of batteries which includes an alkali, a grease, sufficient crude oil to maintain the alkali and grease in a paste form and retard drying thereof, and means for producing a coating film upon the mixture when applied.

3. A composition of matter for use in the treatment of batteries including an alkali, hard oil grease, crude oil, creosote and acid-proof paint.

4. A composition of matter for use in the treatment of batteries including a mixture of bicarbonate of soda, and ammonium carbonate, hard oil grease, crude oil, creosote, and acid-proof paint.

5. A composition of matter for use in the treatment of batteries consisting of the following ingredients or their equivalents substantially in the proportions stated, to wit, bicarbonate of soda, five pounds; ammonium carbonate, one pound; hard oil grease, three pounds; creosote, one ounce; acid-proof paint, two quarts; crude oil, one-half pint.

In testimony that I claim the foregoing as my own, I have hereto affixed my signature.

FREDERICK D. BASS.